US006596410B2

(12) United States Patent
Shimizu

(10) Patent No.: US 6,596,410 B2
(45) Date of Patent: Jul. 22, 2003

(54) CHROME-PLATED SLIDING MEMBER AND MANUFACTURING METHOD THEREOF

(75) Inventor: Kazuo Shimizu, Saitama (JP)

(73) Assignee: Nippon Piston Ring Co., Ltd. (JP)

( * ) Notice: Subject to any disclaimer, the term of this patent is extended or adjusted under 35 U.S.C. 154(b) by 29 days.

(21) Appl. No.: 09/963,786

(22) Filed: Sep. 27, 2001

(65) Prior Publication Data

US 2002/0060159 A1 May 23, 2002

(30) Foreign Application Priority Data

Sep. 29, 2000 (JP) ....................... 2000-300449

(51) Int. Cl.[7] .................. B32B 15/01; B32B 3/30; C25D 5/14; C25D 5/18
(52) U.S. Cl. .............. 428/613; 428/636; 428/667; 428/935; 205/103; 205/113; 205/179
(58) Field of Search ............... 428/666, 667, 428/613, 687, 612, 935, 636, 637; 205/113, 179, 103

(56) References Cited

U.S. PATENT DOCUMENTS

| 3,099,609 A | * | 7/1963 | Katayose | 205/172 |
| 4,039,399 A | * | 8/1977 | Wallace et al. | 205/113 |
| 4,094,749 A | * | 6/1978 | Stange et al. | 205/113 |
| H543 H | * | 11/1988 | Chen et al. | 428/635 |
| 4,846,940 A | * | 7/1989 | Neuhauser et al. | 205/109 |
| 4,876,996 A | * | 10/1989 | Mayer et al. | 123/90.51 |
| 6,013,380 A | * | 1/2000 | Harayama et al. | 428/627 |
| 6,296,951 B1 | * | 10/2001 | Tateishi et al. | 428/635 |

FOREIGN PATENT DOCUMENTS

| EP | 0098776 | * | 1/1984 |
| EP | 0668375 A1 | * | 2/1995 |
| EP | 1215304 A1 | * | 6/2002 |
| JP | 10-053881 | * | 2/1998 |
| JP | 2001-093140 | * | 4/2001 |

* cited by examiner

Primary Examiner—John J. Zimmerman
(74) Attorney, Agent, or Firm—Parkhurst & Wendel, L.L.P.

(57) ABSTRACT

The present invention provides a chrome-plated sliding member free from periodical decreases in wear resistance or seizure resistance without the necessity to intentionally bend a multi-layer hard chrome plating film. This is a sliding member having a multi-layer hard chrome plating film on the sliding surface of the substrate 1. Microcracks 6 opening to the outer surface side of the individual hard chrome plating layers are distributed in hard chrome plating layers 2, 3, 4 and 5. The microcracks of the individual hard chrome plating layers comprise relatively shallow portions 6a where bottoms stop within a single layer, and relatively deep portions 6b and 6c where cracks run through two or more layers. The quantities of the microcracks expressed by the area ratios of microcracks on a cross-section of the hard chrome plating film include a quantity of the portions where cracks stop within a single layer within a range of from 1.5 to 35.0%, a quantity of the portions where cracks run through two or more layers within a range of from 0.5 to 25.0%, and a total quantity of microcracks within a range of from 2.0 to 40.0%.

7 Claims, 1 Drawing Sheet

CHROME-PLATED SLIDING MEMBER AND MANUFACTURING METHOD THEREOF

BACKGROUND OF THE INVENTION

1. Field of the Invention

The present invention relates to a sliding member having a hard chrome-plating film formed on a sliding surface thereof.

2. Description of the Related Art

Sliding members such as a piston ring for an internal combustion engine, a cylinder liner sliding therewith, a rocker arm and a cam shaft are required to be free from seizure with a counterpart member, wear-resistant in the sliding member itself, and not to be aggressive against the counterpart member. To cope with these requirements, it is the conventional practice to apply a hard chrome plating excellent in wear resistance to the surface of a sliding member, particularly the outer peripheral surface of a piston ring.

However, simple application of chrome plating alone to the substrate of the piston ring cannot give a sufficient seizure resistance because the hard chrome-plating film is poor in oil retentivity. A common counter-measure against this problem is to form a number of mesh-shaped microcracks on the surface of the chrome-plating film by applying chrome plating, and then in the same chrome plating bath, conducting etching through application of a polarity reversing treatment. These microcracks serve as lubricant sumps, thus improving oil retentivity of the hard chrome plating film and imparting an excellent seizure resistance to the chrome-plated sliding member.

More recently, however, requirements for a lower fuel consumption and a higher output have become more strict, and along with this, the load imposed on various parts of internal combustion engines including piston rings is only increasing. As a result, some internal combustion engines cannot now sufficiently satisfy requirements for wear resistance, seizure resistance and fatigue strength even with a hard chrome-plating film having microcracks. More specifically, microcracks with a V-shaped cross-section are formed in the hard chrome-plating film of the piston ring through polarity reversing treatment of the film. Consequently, the hard chrome-plating film has initially a sufficient oil retentivity. However, as the thickness decreases as a result of progress of wear, the opening area and the total void volume of the microcracks decrease, this leading to deterioration of oil retentivity and resulting in shortage of seizure resistance. When the chrome-plated piston ring slides in the cylinder, stress concentrates with bottoms of V-shaped cracks (notches) of the hard chrome-plating film as bases, thus causing a so-called "notch effect" and accelerating progress of cracks. This leads to deterioration of the film, and may finally cause breakage.

As a solution of such a problem, there is proposed a method comprising the steps of causing a hard chrome plating layer to precipitate into a small thickness through a positive polarity process onto the sliding surface of a sliding member, then forming a hard chrome plating thin-film layer having microcracks by causing a slight growth of the microcracks through a subsequent polarity reversing step, and sealing openings of the microcracks in a lower layer with the upper layer serving as the hard chrome plating thin-film layer by repeating these positive polarity step and the polarity reversing step, thereby forming a hard chrome plating film having many pores of microcracks independent in the film forming direction (Japanese Unexamined Patent Publication No. 10-53881).

According to the hard chrome plating film of this proposal, the notch effect caused by sliding operation does not reach the microcracks of the lowermost layer before the lowermost hard chrome plating layer is exposed as a result of progress of wear of the hard chrome plating film, thus improving fatigue strength. While the microcracks have a V-shaped cross-section in the both cases, these microcracks are formed in all the layers independently in the film forming direction. Therefore, even when the opening area of the microcracks and the total void volume once decrease along with the progress of wear, new microcracks appear every time the lower hard chrome plating layer is exposed, and oil retentivity recovers.

However, in a hard chrome plating film having microcracks independent in the film forming direction such as that disclosed in Japanese Unexamined Patent Application Publication No. 10-53881, substantially uniform size microcracks vacant pore groups are formed in all the layers. In other words, the bottom of each microcrack vacant pore group stops within the hard chrome plating layer where itself opens. In the film, therefore, the microcrack vacant pore groups are distributed in parallel along the direction in which hard chrome plating layers expand. Areas where a microcrack vacant pore group is non-existent in the film growing direction appear periodically. In this case, wear resistance and seizure resistance decrease periodically along with progress of wear of the hard chrome plating film.

As a solution of this problem, the aforementioned Japanese Unexamined Patent Application Publication No. 10-53881 discloses a method comprising the steps of forming a hard chrome plating layer having wavy swell like a bend in a stratum by applying a plating step after forming appropriate surface irregularities through honing or the like on the sliding surface of a sliding member, forming microcracks through a polarity reversing step, and subsequently, repeating the plating and polarity reversing steps. In a multi-layer hard chrome plating film formed by this method, microcrack vacant pore groups are distributed in wavy swell in match with bending of the layers. Even in progress of wear of the hard chrome plating film, therefore, microcracks always appear uniformly on the surface of the film.

However, in order to bend the hard chrome plating layers by this method, it is necessary to control the extent of surface irregularities of the interface with the substrate to be plated through a surface treatment such as honing. Even when appropriate surface irregularities are formed by applying a surface treatment such as honing to the interface with the substrate of the sliding member, bending becomes slower along with growth and multiplication of the hard chrome plating layers, and the hard chrome plating layer near the surface is relatively flattened, thus making it impossible to completely prevent periodical decrease in wear resistance and seizure resistance.

SUMMARY OF THE INVENTION

The present invention was developed in view of the circumstances as described above and has a first object to provide a chrome-plated sliding member which permits prevention of a periodical decrease in wear resistance and seizure resistance even without intentionally forming swell of the multi-layer hard chrome plating film while effectively making use of chrome plating conventionally available at a low manufacturing cost.

A second object of the invention is to provide a manufacturing method of a chrome-plated sliding member, which permits prevention of a periodical decrease in wear resistance and seizure resistance of a multi-layer chrome-plated film without the need to intentionally form surface irregularities on the interface with the substrate.

To achieve the aforementioned objects of the invention, the invention provides a chrome-plated sliding member having a hard chrome plating film comprising at least two hard chrome plating layers provided on the interface with a substrate, wherein microcracks opening to the outer surface side of the hard chrome plating layers distributed in the individual hard chrome plating layers; each of the microcracks in each hard chrome plating layer comprises a portion where the crack stops within a layer containing the opening thereof, and a portion where the crack propagates into the hard chrome plating layer under the layer containing the opening thereof, relative to the depth direction; and quantities of microcracks as expressed by area ratios of microcracks in a cross-section of the hard chrome plating film comprise a quantity of the portion where the crack stops within the layer containing the opening thereof within a range of from 1.5 to 35.0%, a quantity of the portion where the crack propagates into the hard chrome plating layer under the layer containing the opening thereof within a range of from 0.5 to 25.0%, and a total quantity of microcracks within a range of from 2.0 to 40.0%.

The manufacturing method of a chrome-plated sliding member provided by the invention comprises a hard chrome plating step of the interface with a substrate by use of a chrome plating bath, then an etching step by reversing polarity over a period of time within a range of from 100 to 2,000 micro-seconds, and repeating the hard chrome plating step and the etching process at least once, thereby forming a hard chrome plating film comprising at least two hard chrome plating layers.

In the chrome-plated sliding member of the invention, microcracks of the individual hard chrome plating layers forming the multi-layer hard chrome plating film have relatively shallow portions where bottoms thereof stop in the layer containing the openings thereof and relatively deep portions where cracks run through to reach a deeper position than the layer containing the opening thereof. Pores of microcracks are therefore present even in an area immediately before transfer from an upper layer to a lower layer of the individual hard chrome plating layers. Periodical decreases in oil retentivity do not therefore occur, or occurrence thereof, if any, causes only a slight decrease in oil retentivity. Stable wear resistance and seizure resistance are always ensured in use for a long period of time.

According to the manufacturing method of a chrome-plated sliding member of the invention, it is possible to manufacture a chrome-plated sliding member having excellent sliding performance as described above. According to the method of the invention, it is not necessary to intentionally form surface irregularities for bending the chrome-plated film on the interface with the substrate, thus permitting simplification of the surface treatment steps of the substrate.

According to the invention, particularly, there is available a chrome-plated piston ring excellent in wear resistance, seizure resistance and fatigue strength.

DESCRIPTION OF THE PREFERRED EMBODIMENTS

Figure 1:
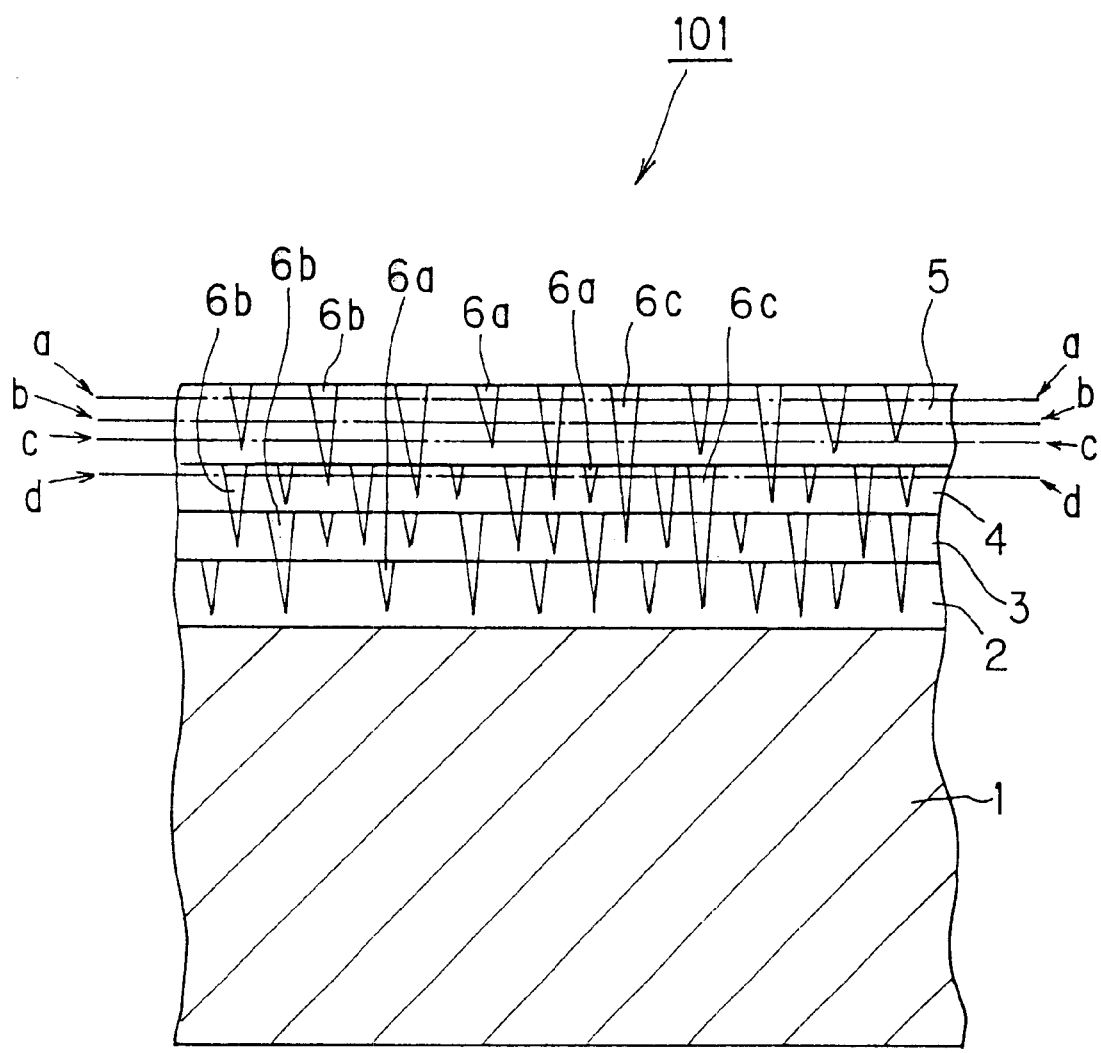
FIG. 1 is a sectional view schematically illustrating the structure of a chrome plating film for a typical chrome-plated sliding member of the present invention.

The chrome-plated sliding member of the present invention has a hard chrome plating film comprising at least two hard chrome plating layers provided on an area to serve as a sliding surface of the interface with a substrate, wherein microcracks opening to the outer surface side of the hard chrome plating layers distributed in the individual hard chrome plating layers; each of the microcracks in each hard chrome plating layer comprises a portion where the crack stops within a layer containing the opening thereof, and a portion where the crack propagate into the hard chrome plating layer under the layer containing the opening thereof, relative to the depth direction; and quantities of microcracks as expressed by area ratios of microcracks in a cross-section of the hard chrome plating film comprise a quantity of the portion where the crack stops within the layer containing the opening thereof within a range of from 1.5 to 35.0%, a quantity of the portion where the crack propagates into the hard chrome plating layer under the layer containing the opening thereof within a range of from 0.5 to 25.0%, and a total quantity of microcracks within a range of from 2.0 to 40.0%.

The chrome-plated sliding member of the invention is applicable to all sliding members in general. For example, it is applicable to a piston ring outer periphery, a cylinder liner inner periphery, a rocker arm sliding surface, a cam shaft outer periphery, and a journal portion, and among others, it is suitable applicable to a piston ring.

FIG. 1 schematically illustrates a cross-section of a typical chrome-plated sliding member of the invention. In this sliding member 101, a hard chrome plating film comprising a lamination of four hard chrome plating layers (2, 3, 4 and 5) is formed on the sliding surface of the a substrate 1 of the sliding member. Microcracks opening to the outer surface side of the hard chrome plating layers are distributed in all the hard chrome plating layers of the film. In other words, there are formed microcracks opening to the outer surface side of the first chrome plating layer 2 the closest to the interface with the substrate, microcracks opening to the outer surface side of the second chrome plating layer 3 provided immediately thereon, microcracks opening to the outer surface side of the third chrome plating layer 4 laminated thereon, and microcracks opening to the outer surface side of the fourth chrome plating layer 5 which is the outermost layer. Microcracks should preferably be uniformly distributed in all the layers in the hard chrome plating film.

Microcracks having a V-shaped cross-section are formed into a mesh shape on all the hard chrome plating layers. Single continuous microcracks are formed at least at the surface opening. Independent microcracks smaller in length and/or in depth may be mixed in gaps of the single mesh-shaped microcracks. The depth reached by crack bottom differs between places even among single microcracks on the hard chrome plating layer surface. Independent microcracks increase therefore according as the processing margin for polishing of the hard chrome plating film, or according as wear progresses.

Except for the first chrome plating layer 2 the closest to the interface with the substrate, microcracks of the individual hard chrome plating layers include portions where cracks stop in the layer containing openings thereof relative to the depth direction (i.e., portions where bottoms stop in the layer containing openings thereof) 6a and portions where cracks reach even the interior of the hard chrome plating layer lower than the layer containing the openings thereof (i.e., portions where bottoms reach the interior of the hard chrome plating layer lower than the layer containing the openings thereof) 6b and 6c. The portions where the microcracks run through to reach the lower layer may contain not only the portion 6b in which the microcracks cover only two layers, but also the portion 6c in which cracks cover three or more layers. The portions of the microcracks running through to reach the lower layer may partially be integrated with the microcracks opening to the lower layer.

In the chrome-plated sliding member of the invention, the chrome plating film is formed by laminating two or more hard chrome plating layer having microcracks. Therefore, the openings of the microcracks opening to the outer surface side (sliding surface side) of the hard chrome plating layers are sealed by the upper hard chrome plating layer. As a result, while the aforementioned notch effect acting on the chrome-plated sliding member of the invention exerts an influence on the microcracks opening to the outermost hard chrome plating layer, the microcracks opening to the lower hard chrome plating layer are covered with, and protected by, the upper hard chrome plating layer, so that the latter microcracks are not affected by the notch effect until the upper layer disappears as a result of wear. Therefore, the hard chrome plating film of the chrome-plated sliding member of the invention is hardly susceptible to progress of microcracks caused by the notch effect, excellent in fatigue strength, and hardly suffers from deterioration of the film or breakage of the sliding member.

In the chrome-plated sliding member of the invention, the microcracks formed on all the hard chrome plating layers have a substantially V-shaped cross-section. The opening area and the volume of open pores of the microcracks therefore decrease along with progress of wear of the hard chrome plating film. For example, the opening area and the volume of open pores of the microcracks at the depth indicated by symbol b are smaller than those at the depth indicated by symbol a. However, when an upper hard chrome plating layer completely disappear by wear, many new microcracks opening to a lower layer are exposed. The opening area and the volume of open pores of the microcracks increase again, causing recovery of an excellent oil retentivity. For example, the opening area and the volume of open pores of the microcracks at the depth indicated by symbol d are almost equal to those at the depth indicated by symbol a.

In the chrome-plated sliding member of the invention, furthermore, the microcracks of the individual hard chrome plating layers contain portions running to the interior of the hard chrome plating layer lower than the layer containing openings thereof in the depth direction. Therefore, even at a depth immediately prior to appearance of a lower hard chrome plating layer as a result of sinking of the upper hard chrome plating layer caused by wear, there are still present microcracks in a sufficient quantity. For example, even at a depth indicated by symbol c of the hard chrome plating film, there are existent open pores of the microcracks represented by reference numerals 6b and 6c. Therefore, the chrome-plated sliding member of the invention never suffers from a periodical decrease in oil retentivity even upon progress of wear of the hard chrome plating film, or a decrease, if any, shows only a slight range of variation, thus exhibiting constant wear resistance and seizure resistance.

The quantity of microcracks, in terms of the area ratio of microcracks on a cross-section in the thickness direction of the hard chrome plating film should be adjusted so that the portions where cracks stop in the layer containing openings thereof are within a range of from 1.5 to 35.0%, the portions where cracks run into the interior of the hard chrome plating layer lower than the layer containing the openings thereof are within a range of from 0.5 to 25.0%, and the total quantity of microcracks is within a range of from 2.0 to 40.0%. In order to reduce variation of oil retentivity dependent upon the film depth while keeping sufficient oil retentivity and strength of the film as a whole, it is necessary to adjust the breakdown quantities of microcracks within the above-mentioned ranges.

The breakdown quantities of the microcracks in the hard chrome plating layer are appropriately adjusted within the aforementioned ranges. Unless special circumstances are present, the portions where cracks stop in the layer containing openings thereof should preferably be within a range of from 1.5 to 24.5%, the portions where cracks run into the interior of the hard chrome plating layer lower than the layer containing openings thereof should preferably be within a range of from 0.5 to 15.0%, and the total quantity of microcracks should preferably be within a range of from 2.0 to 25.0%.

When the portions where the microcracks are locally present in the hard chrome plating layer containing openings thereof, as expressed by the above-mentioned area ratio within cross-section, is under 1.5%, vacant pores of microcracks decrease, leading to a poorer oil retentivity. In this case, when making up the shortage of microcracks limited within a layer with microcracks running over two or more layers, the notch effect affects the lower hard chrome plating layer. This tends to easily cause propagation of cracks, and causes deterioration of the hard chrome plating film and a decrease in breakage resistance.

When the sectional area ratio of the portions where microcracks are locally present in a hard chrome plating layer containing openings thereof is over 35.0%, the quantity of microcracks spreading over two or more layers becomes relatively fewer, and variation of oil retentivity caused by the film depth becomes larger. When forming microcracks covering two or more layers in a quantity sufficient to inhibit a change in oil retentivity, this results in a more apparent tendency toward corruption of the hard chrome plating film.

When the sectional area ratio of the portions where microcracks run to reach the interior of the hard chrome plating layer lower than the layer containing openings thereof is under 0.5%, variation of oil retentivity depending upon the film depth becomes larger. When the sectional area ratio of the portions where microcracks run to reach the interior of the hard chrome plating layer lower than the layer containing openings thereof is over 25.0%, the aforementioned notch effect affects the lower hard chrome plating layer. This tends to easily cause progress of cracks, thus causing deterioration of the hard chrome plating film and a decrease in breakage resistance.

When the total quantity of the portions limiting the microcracks within a layer and the portions covering two or more layers is under 2.0%, there is a shortage of vacant pores for retaining lubricant, resulting in a poorer oil retentivity. When it is over 40.0%, on the other hand, there is a more apparent tendency toward corruption of the hard chrome plating film, leading to an insufficient strength of the film.

The thickness of the individual layers composing the hard chrome plating film and the opening width of the microcracks in the individual layers are appropriately adjusted by taking account of the kind and the use of the sliding member to which the present invention is applied. When the invention is applied to a piston ring, the quantity of the portions where the microcracks are locally present in a hard chrome plating layer containing openings thereof and the portions where the microcracks run to reach the interior of a hard chrome plating layer lower than the layer containing openings thereof can be adjusted within the aforementioned ranges while keeping a good balance of various performance requirements for the piston ring, by adjusting the thickness of the hard chrome plating layers composing the hard chrome plating film within a range of from 5.0 to 30.0 μm, and the opening width of the microcracks opening to the outer surface of the layer to up to 2.0 μm. The opening width of microcracks of up to 2.0 μm means that the opening width of substantially all the microcracks is up to 0.2 μm: there is no microcrack having an opening width of over 0.2 μm, or the opening width of over 0.2 μm, if any, exerts no adverse effect on performance of the sliding member, and is therefore negligible.

In this case, the thickness of the hard chrome plating layer serving as an intermediate layer should preferably be within a range of from 5.0 to 30.0 μm, and at the same time, the outermost hard chrome plating layer should preferably have a thickness larger than that of the hard chrome plating layer serving as the intermediate layer and preferably be up to 50 μm. The outermost hard chrome plating layer should preferably have a thickness of at least 5 μm. In this case, the opening width of the microcracks formed on the outermost hard chrome plating layer should be up to 0.2 μm.

A deformation of the chrome-plated sliding member caused by sliding resistance can be inhibited by rigidity of a portion of the hard chrome plating film near the surface: breakage resistance can be improved by increasing rigidity of this portion. It is therefore possible to impart breakage resistance to the sliding member by forming the outermost hard chrome plating layer into a thickness larger than that of the intermediate layer to increase rigidity of this portion. When the thickness of the outermost hard chrome plating layer is smaller than that of the hard chrome plating layer serving as the intermediate layer, the portion of the film near the surface has only an insufficient rigidity. When the thickness of the outermost hard chrome plating layer is over 50 μm, deformation caused by sliding resistance is limited within the outermost portion, and there is unavailable an effect of absorbing the displacement by the entire film including the intermediate layer.

When the hard chrome plating film comprises three or more layers, it is desirable to adjust the thickness of the outermost layer and the intermediate layer within the above-mentioned ranges, and the thickness of the hard chrome plating layer the closest to the interface with the substrate should preferably be the largest among the hard chrome plating layers and up to 80 μm. In other words, the layer the closest to the interface with the substrate is formed into the largest thickness, and the outermost plating layer is formed into the second largest thickness. In this case, the opening width of the microcracks formed in the hard chrome plating layer the closest to the interface with the substrate should be up to 0.2 μm.

The microcracks of the hard chrome plating layer the closest to the interface with the substrate can be made fewer in number and smaller in width by forming this hard chrome plating layer into a large thickness, thus improving rigidity of the hard chrome plating film as a whole. The thickness of the hard chrome plating layer the closest to the interface with the substrate is made larger than the thickness of the outermost hard chrome plating layer with a view to taking balance between rigidity of the outermost hard chrome plating layer and toughness of the intermediate layer to absorb displacement upon sliding by the entire film. When the hard chrome plating layer the closest to the interface with the substrate is thinner than the other plating layers, the effect of inhibiting displacement near the interface with the substrate is not sufficient. When the thickness of the hard chrome plating layer the closest to the interface with the substrate is over 80.0 μm, the ratio of the lowermost layer to the total thickness of the film becomes larger, resulting in a relative decrease in number of the thin plating layers serving as intermediate layers, thus making it difficult to effectively use the effect of toughness of the multi-layer chrome plating film. If the hard chrome plating layer the closest to the interface with the substrate is formed into the largest thickness in the film of about 80 μm, the microcracks having an opening width of 0.2 μm would have a depth of about 50 μm, and a portion of a thickness of about 30 μm not containing microcracks of the plating layer remains in the proximity of the interface with the substrate. Therefore, this provides an advantage of excellent corrosion resistance and adhesion of the substrate.

The manufacturing method of a chrome-plated sliding member of the invention will now be described. The chrome-plated sliding member of the invention can be manufactured by using a chrome plating bath, applying a hard chrome plating step to the surface of a substrate (material to be plated), then conducting an etching step by reversing polarity for a period of time within a range of from 100 to 2,000 micro-seconds, and repeating at least once the hard chrome plating step and the etching step, thereby forming a hard chrome plating film comprising two or more hard chrome plating layers.

The thickness of the hard chrome plating layers and the quantity and depth of microcracks are adjusted changing various conditions such as the plating temperature, current density and impressing time in the plating step and the polarity reversing step (etching step).

In the invention, the polarity switching speed upon transferring from the plating step to the polarity reversing step is adjusted for the purpose of forming microcracks comprising a mixture of relatively shallow portions and deep portions. If switching of polarity from the plating step to the polarity reversing step is rapidly completed, the depth of the microcracks remain within a single hard chrome plating layer. If, on the other hand, polarity switching from the plating step to the polarity reversing step is completed slowly, i.e., over a relatively long period of time, part of the microcracks do not remain within a single layer, but run to reach the lower layer, thus forming deep cracks spreading over two or more layers. As a result, in the multi-layer hard chrome plating film, there is formed a microcrack group containing portions where cracks stop within a single layer and deep portions spreading over two or more layers.

The manufacturing method of a piston ring, as an example, will be described in detail. When manufacturing a piston ring, materials conventionally used for piston rings such as martensite stainless steel and Si—Cr steel may be used for a substrate. Prior to chrome plating, the surface of the substrate formed into a prescribed shape is subjected to pre-treatments such as degreasing, rinsing and honing as required. For example, a pre-treatment comprises the steps of washing off grease on the substrate surface by vapor of an organic solvent such as trichloroethylene (degreasing), and then, removing oxides and the like on the interface of substrate by immersing the substrate in hydrochloric acid heated to 30 to 80° C. for 15 to 300 seconds, thereby exposing the substrate surface (pickling). Then, uniformly pressure-spraying (2 to 10 kg/mm2) an aqueous solution suspending and dissolving hard particles such as ceramics onto the entire surface of the substrate, and the surface is made crape-shaped to improve adhering strength with the plating film (liquid honing).

After this pre-treatment, a plating step (positive polarity step) and a polarity reversing step (etching step) are repeatedly applied to the substrate interface (substrate surface) to form by lamination hard chrome plating layers having microcracks. An acidic chromic acid solution conventionally used may be used as a chrome plating bath. The substrate is immersed in the chrome plating bath, and temperature of the chrome plating bath is maintained at 45 to 75° C. Electrolytic polishing is performed by impressing a current density of 20 to 100 A/dm2 for an impressing time of 10 to 120 seconds with the substrate as an anode and the counterpart electrode as a cathode.

After the completion of electrolytic polishing, a lowermost hard chrome plating layer the closest to the substrate interface is formed. More specifically, immediately after the electrolytic polishing, the polarity is reversed with the substrate as a cathode and the counterpart electrode as an anode, and current is impressed under conditions including a current density of 20 to 100 A/dm2 and an impressing time of 10 to 200 minutes to cause precipitation of hard chrome plating layers of predetermined thicknesses. Then, the polarity is reversed in a relatively short switching time. With the substrate as an anode and the counterpart electrode as a cathode, current is impressed under conditions including a current density of 20 to 100 A/dm2 and an impressing time of 10 to 200 seconds to cause elution of the hard chrome plating layers so as to retain a predetermined thickness (polarity reversing step). At this stage, the lowermost hard chrome plating layer is formed, and it is necessary to arrest the microcrack depth within the lowermost layer. For this purpose, the switching time from plating to polarity reversing should be relatively short. As described above, the lowermost layer of the multi-layer hard chrome plating film of a piston ring should preferably be the largest among the layers of the film within a range of up to 80 μm. When taking this thickness into account, microcracks having an opening width of up to 0.2 μm and an appropriate depth can be formed by adjusting the switching time from the plating step to the polarity reversing step within 100 micro-seconds in the stage of forming the lowermost layer.

Then, a hard chrome plating layer serving as an intermediate layer is formed. More specifically, after the completion of the polarity reversing step of the lowermost layer, the polarity is reversed again. With the substrate as an anode and the counterpart electrode as a cathode, current is impressed at a current density of 30 to 120 A/dm2 and an impressing time of 2 to 100 minutes to cause precipitation of a hard chrome plating layer having a predetermined thickness (plating step). Then, the polarity is reversed for a slow switching time. With the substrate as an anode and the counterpart electrode as a cathode, current is impressed at a current density of 20 to 100 A/dm2 and an impressing time of 10 to 200 seconds, so as to cause elution of the hard chrome plating layer so that a predetermined thickness remains (polarity reversing step).

As described above, the intermediate layer of the multi-layer hard chrome plating film of the piston ring should preferably be formed into a thickness of from 5.0 to 30.0 μm. When a hard chrome plating layer is formed into a thickness of this order, microcracks having an opening width of up to 0.2 μm and comprising a mixture of relatively shallow portions where cracks stop within a single layer and relatively deep portions where cracks spread over two or more layers can be formed by adjusting the switching time from the plating step to the polarity reversing step within a range of from 100 to 2,000 micro seconds.

The intermediate layer immediately on the lowermost layer is formed through these second plating step and polarity reversing step. Subsequently, intermediate layers in a necessary number are formed by lamination by repeating the plating step and the polarity reversing step as in the above-mentioned second ones.

After forming the intermediate layers in the necessary number, the outermost thickest hard chrome plating layer is formed through final plating step and polarity reversing step. After the completion of the polarity reversing step for the intermediate layers, polarity is reversed. With the substrate as a cathode and the counterpart electrode as an anode, current is impressed at a current density of 30 to 120 A/dm2 for an impressing time of 2 to 200 minutes so as to cause precipitation of a hard chrome plating layer of a predetermined thickness (plating step. Then, polarity is reversed in a slow switching time. With the substrate as an anode and the counterpart electrode as a cathode, current is impressed at a current density of 20 to 100 A/dm2 for an impressing time of 10 to 200 seconds so that a hard chrome plating layer is eluted leaving a predetermined thickness (polarity reversing step). As described above, the outermost layer of the multi-layer hard chrome plating film of the piston ring should preferably be formed into the thickness of 5 to 50 μm. Within this thickness range, it is possible to form microcracks comprising having an opening width of up to 0.2 μm and comprising a mixture of relatively shallow portions where cracks stop within a single layer and relatively deep portions where cracks spread over two or more layers, by adjusting the switching time from the plating step to the polarity reversing step within a range of from 100 to 2,000 micro seconds.

The multi-layer hard chrome plating film is completed through the steps as described above, and the chrome-plated piston ring is obtained.

EXAMPLES

Examples of manufacture of a piston ring as a chrome-plated sliding member of the present invention and the result of evaluation will be presented.

A. Example of Manufacture (1) Manufacture of the product of the invention

Si—Cr was used as a substrate for the piston ring. The piston ring substrate was degreased by use of vapor of trichloroethylene. Then, surface oxides and the like were removed through pickling by immersing the substrate in hydrochloric acid heated to 30 to 80° C. for 15 to 300 seconds. Then, an aqueous solution prepared by suspending and dissolving hard particles such as ceramics was pressure-sprayed (5 kg/mm2) over the entire surface of the substrate to finish into a crape-shaped surface.

Then, a known fluoriding bath was prepared as a plating bath. The piston ring substrate finished into a crape-shaped surface was immersed in this plating bath, and current was impressed under the following conditions for electrolytic polishing:

(Conditions for electrolytic polishing)
  Current density: 60 A/dm2
  Impressing time: 20 seconds After electrolytic polishing, polarity was reversed. With the substrate as a cathode and the counterpart electrode as an anode, a plating step was conducted under the following conditions. Immediately thereafter, polarity was reversed in a switching time of 750 micro seconds. With the substrate as an anode and the counterpart electrode as a cathode, a polarity reversing step was performed under the following conditions, thereby forming a lowermost hard chrome plating layer:

(Plating step of lowermost layer)
  Current density: 60 A/dm2
  Impressing time: 30 minutes
(Polarity reversing step of lowermost layer)
  Current density: 60 A/dm2
  Impressing time: 90 seconds Then, polarity was reversed again. With the substrate as a cathode and the counterpart electrode as an anode, the plating step was carried out under the following conditions. Immediately thereafter, polarity was reversed in a switching time of 750 micro seconds. With the substrate as an anode and the counterpart electrode as a cathode, the polarity reversing step was applied under the following conditions to form a hard chrome plating layer serving as a first intermediate layer. The plating step and the polarity reversing step of the first intermediate layer were repeated ten times, to form 11 intermediate layers including the first intermediate layer.

(Plating step of intermediate layers)
  Current density: 60 A/dm2
  Impressing time: 15 minutes
(Polarity reversing step of intermediate layers)
  Current density: 60 A/dm2
  Impressing time: 90 seconds Subsequently, polarity was reversed again. With the substrate as a cathode and the counterpart electrode as an anode, the plating step was conducted under the following conditions. Immediately after this, polarity was reversed in a switching time of 750 micro seconds. With the substrate as an anode and the counterpart electrode as a cathode, the polarity reversing step was carried out under the following conditions to form an outermost hard chrome plating layer.

(Plating step of outermost layer)
  Current density: 60 A/dm2
  Impressing time: 20 minutes
(Polarity reversing step of outermost layer)
  Current density: 60 A/dm2
  Impressing time: 60 seconds (2) Manufacture of conventional product Si—Cr was used, as in the above-mentioned case of the product of the present invention, as a piston ring substrate. The substrate surface was finished into a crape shape by applying degreasing, pickling and liquid honing to this piston ring substrate in the same procedure as in the case of the product of the present invention.

Then, the piston ring substrate was immersed in a plating bath having the same composition as that used in the manufacture of the above-mentioned product of the invention, and electrolytic polishing was carried out under the same conditions as in the product of the invention. Subsequently, polarity was reversed. With the substrate as a cathode and the counterpart electrode as an anode, a plating step was conducted under the following conditions. Immediately after plating, polarity was reversed in a switching time of 1,500 micro seconds. With the substrate as an anode and the counterpart electrode as a cathode, a polarity reversing step was carried out under the following conditions to form a single-layer hard chrome plating film.

(Plating step of conventional product)
  Current density: 60 A/dm2
  Impressing time: 15 minutes
(Polarity reversing step of conventional product)
  Current density: 60 A/dm2
  Impressing time: 90 seconds (3) Manufacture of comparative products 1 to 4

By the application of the manufacturing method of the product of the invention, plating conditions permitting formation of films shown in Table 1 were set and comparative products 1 to 4 were manufactured.

B. Evaluating Method (1) Wear Test

An Amsler wear tester was used. A manufactured piston ring was fixed. Substantially a half a rotating piece serving as the counterpart member was immersed in an oil and brought into contact with the fixed piece while giving a load. A test was carried out under the following conditions, and the amount of wear (wearing sinkage: $\mu$m) was measured from a step profile by means of a roughness meter.

(Wear test conditions)
  Counterpart member: FC25 (hardness (HRB): 98)
  Lubricant: Turbine oil (#100)
  Oil temperature: 80° C.
  Circumferential rotation speed: 1 m/sec (478 rpm)
  Load: 80 kg
  Time: 7 hr.

(2) Scuff test

An Amsler wear tester was used. A manufactured piston ring was used as a fixed piece. Oil was deposited onto a rotating piece serving as a counterpart member, and the rotating piece was brought into contact with the fixed piece while applying a load. The load was linearly and continuously increased at a rate of 10 kg/nun under the following conditions, and the load upon occurrence of a scuff and a load signal was adopted as a scuff resistance load (kg) of the tested piece.

(Scuff test conditions)
  Counterpart member: FC25 (HRB: 98)
  Lubricant: #2 spindle oil
  Oil temperature: As it is
  Circumferential rotation speed: 1 m/sec (478 rpm)

(3) Fatigue strength test

A real ring type fatigue tester was used. The test was repeated $10^7$ times with a repeating speed of 2,000 cycle/min while imposing a prescribed load onto the ring. After clearance of $10^7$ times under the prescribed load, the level of load was raised, and the test was repeated $10^7$ times. The largest load having cleared $10^7$ times was adopted as the fatigue strength (kg) of the tested member.

(4) Film impact strength test

A company's original impact tester was used. An impact energy of a prescribed load was applied until peeling of the plating film occurred by hitting the ring corner 45° of the tested member at a stroke of 1.5 mm, and the number of hits until occurrence of peeling was counted.

C. Results (1) Configuration of tested member are shown in the following Table 1.

TABLE 1

| Tested member | Opening width of microcracks | breakdown of quantity of cracks |
|---|---|---|
| Product of The invention | up to 0.2 $\mu$m | Total quantity of microcracks: 18.0%<br>Limited within a single layer: 12.0%<br>Spreading over two or more layers: 6.0% |
| Conventional product | up to 0.2 $\mu$m | Total quantity of microcracks: 20.0% |
| Comparative member 1 | up to 0.2 $\mu$m | Total quantity of microcracks: 1.30%<br>Limited within a single layer: 1.0%<br>Spreading over two or more layers: 0.3% |
| Comparative member 2 | up to 0.2 $\mu$m | Total quantity of microcracks: 31.0%<br>Limited within a single layer: 1.0%<br>Spreading over two or more layers: 30.0% |

TABLE 1-continued

| Tested member | Opening width of microcracks | breakdown of quantity of cracks |
|---|---|---|
| Comparative member 3 | up to 0.2 μm | Total quantity of microcracks: 37.3% Limited within a single layer: 37.0% Spreading over two or more layers: 0.3% |
| Comparative member 4 | up to 0.2 μm | Total quantity of microcracks: 45.0% Limited within a single layer: 30.0% Spreading over two or more layers: 15.0% |

(2) Result of evaluation are shown in Table 2 by exponentializing with the measured value for the conventional product as 100.

TABLE 2

| Tested member | Wear quantity index | Scuff resistance load index | Fatigue strength index | Film impact strength index |
|---|---|---|---|---|
| Product of the invention | 80 | 125 | 110 | 115 |
| Conventional product | 100 | 100 | 100 | 100 |
| Comparative member 1 | 120 | 80 | 100 | 100 |
| Comparative member 2 | 95 | 130 | 80 | 85 |
| Comparative member 3 | 95 | 135 | 95 | 95 |
| Comparative member 4 | 95 | 140 | 95 | 85 |

The chrome-plated sliding member of the present invention has a multi-layer hard chrome plating film comprising two or more laminated hard chrome plating layers, and microcracks opening to the outer surface side of the individual chrome plating layers are formed in all the hard chrome plating layers. Therefore, the notch effect caused by sliding is cut off by the outermost layer, and does not affect the microcracks formed in the lower layers, thus leading to an excellent fatigue strength, and making it difficult to suffer from deterioration of the film or breakage of the sliding member itself. Even upon decrease of vacant pores of the microcracks opening to the surface as a result of wear of the outermost layer, new microcracks appear when the lower layer is exposed after complete disappearance of the outermost layer by wear, thus ensuring recovery of excellent oil retentivity.

In the chrome-plated sliding member of the invention, the microcracks of the individual hard chrome plating layers composing the multi-layer hard chrome plating film comprise relatively shallow portions where bottoms stop within a layer containing openings thereof, and deep portions where cracks run through to reach a layer deeper than the layer containing the openings thereof. Therefore, even in the area immediately before transfer from an upper hard chrome plating layer to a lower layer, there are present vacant pores of microcracks. This prevents a periodical decrease in oil retentivity, or drop of oil retentivity, if any, is slight. As a result, stable wear resistance and seizure resistance are ensured in use for a long period of time.

According to the manufacturing method of a chrome-plated sliding member of the invention, it is possible to manufacture a chrome-plated sliding member having excellent sliding properties as described above. According to the manufacturing method of the invention, it is not necessary to intentionally form surface irregularities to bend the chrome plating film on the substrate interface, thus permitting simplification of the surface treatment process of the substrate.

In particular, according to the present invention, there is provided a chrome-plated piston ring excellent in wear resistance, seizure resistance and fatigue strength. The chrome-plated piston ring to which the invention is applied is available at a low cost and has performance superior to that of the conventional chrome-plated piston ring, which can cope with improvement of output of a medium-quality internal combustion engine because of the balance with economic merits.

What is claimed is:

1. A chrome-plated sliding member comprising a substrate and a hard chrome plating film comprising an outer surface and at least two hard chrome plating layers at least one of which forms the interface with the substrate, wherein microcracks in an originating layer opening to the outer surface of said hard chrome plating layers are distributed in the individual hard chrome plating layers;

each hard chrome plating layer comprises portions where the microcracks stop within the originating layer, and portions where the microcracks propagate in a depth direction into the hard chrome plating layer under the originating layer; and quantities of microcracks as expressed by area ratios of microcracks in a cross-section of said hard chrome plating film comprise a quantity of the portions where the microcracks stop within the originating layer within a range of from 1.5 to 35.0%, a quantity of the portions where the microcracks propagate into the hard chrome plating layer under the originating layer within a range of from 0.5 to 25.0%, and a total quantity of microcracks within a range of from 2.0 to 40.0%.

2. The chrome-plated sliding member according to claim 1, wherein the thickness of the individual chrome plating layers is within a range of from 5.0 to 30.0 μm, and the width of the opening of said microcracks is up to 0.2 μm.

3. The chrome-plated sliding member according to claim 1, wherein the thickness of the outermost hard chrome plating layer is larger than the thickness of the other hard chrome plating layers in said hard chrome plating film and within a range of up to 50 μm; the thickness of the other hard chrome plating layers is within a range of from 5.0 to 30.0 μm; and the opening width of microcracks in the individual layers including the outermost hard chrome plating layer is up to 0.2 μm.

4. The chrome-plated sliding member according to claim 1, wherein said hard chrome plating film comprises three or more hard chrome plating layers; the thickness of the hard chrome plating layer closest to the interface with the substrate is the largest thickness in the hard chrome plating film and is within a range of up to 80 μm; the thickness of the outermost hard chrome plating layer is the largest thickness next to the hard chrome plating layer closest to the interface with the substrate, and within a range of up to 50 μm; the thickness of the other hard chrome plating layers is within a range of from 5.0 to 30.0 μm; and the opening width of microcracks in layers including the hard chrome plating layer closest to the interface with the substrate and the outermost hard chrome plating layer is up to 0.2 μm.

5. The chrome-plated sliding member according to claim 1, wherein said member is a piston ring.

6. A method for manufacturing a chrome-plated sliding member comprising a substrate and a hard chrome plating film comprising an outer surface and at least two hard chrome plating layers at least one of which forms the interface with the substrate, wherein microcracks in an originating layer opening to the outer surface of said hard chrome plating layers are distributed in the individual hard chrome plating layers;

each hard chrome plating layer comprise portions where the microcracks stop within the originating layer, and portions where the microcracks propagate in a depth direction into the hard chrome plating layer under the originating layer; and quantities of microcracks as expressed by area ratios of microcracks in a cross-section of said hard chrome plating film comprise a quantity of the portions where the microcracks stop within the originating layer within a range of from 1.5 to 35.0%, a quantity of the portions where the microcracks propagate into the hard chrome plating layer under the originating layer within a range of from 0.5 to 25.0%, and a total quantity of microcracks within a range of from 2.0 to 40.0%, the method comprising:

hard chrome plating the interface with a substrate by use of a chrome plating bath to form a hard chrome plating layer, then etching the hard chrome plating layer by reversing polarity over a period of time within a range of from 100 to 2,000 micro-seconds, and repeating said hard chrome plating and said etching at least once, thereby forming a hard chrome plating film comprising at least two hard chrome plating layers.

7. The manufacturing method according to claim 6, comprising:

forming a first hard chrome plating layer closest to the interface with a substrate by first plating a hard chrome plating layer on the interface with the substrate by means of a chrome plating bath, and then etching the hard chrome plating layer by reversing polarity over a period of time shorter than 100 micro-seconds;

forming a second hard chrome plating layer as an intermediate layer by second plating a hard chrome plating layer on the hard chrome plating layer closest to the interface with the substrate, by reversing polarity over a period of time within a range of from 100 to 2,000 micro-seconds; and forming a desired quantity of intermediate layers and an outermost hard chrome plating layer by repeating at least once the second plating a hard chrome plating layer for forming said intermediate hard chrome plating layer and the etching the second hard chrome plating layer.

* * * * *